United States Patent
Puckette, IV et al.

(10) Patent No.: US 6,424,250 B1
(45) Date of Patent: Jul. 23, 2002

(54) COMMUNICATION SYSTEM UTILIZING MODIFIED GEOMETRIC HARMONIC MODULATION

(75) Inventors: Charles McDonald Puckette, IV, Scotia; Gary Jude Saulnier, Rexford; Richard August Korkosz, Rotterdam Junction; John Erik Hershey, Ballston Lake, all of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/263,582

(22) Filed: Mar. 8, 1999

(51) Int. Cl.[7] .............................................. N01N 37/36
(52) U.S. Cl. ........................ 340/310.02; 340/310.01; 340/310.03; 340/810.01; 375/235; 375/232; 375/230; 375/229; 375/346; 375/259
(58) Field of Search ................... 340/310.02, 310.01, 340/810.01, 310.03; 375/235, 232, 230, 229, 346, 259

(56) References Cited

U.S. PATENT DOCUMENTS

| | | | |
|---|---|---|---|
| 5,195,098 A | * 3/1993 | Johnson et al. | 371/37.2 |
| 5,550,880 A | * 8/1996 | Abdel-Malek et al. | 375/376 |
| 5,563,906 A | 10/1996 | Hershey et al. | 375/200 |
| 5,844,949 A | 12/1998 | Hershey et al. | 375/346 |
| 5,903,594 A | * 5/1999 | Saulnier et al. | 375/200 |
| 5,949,821 A | * 9/1999 | Emami et al. | 375/235 |

OTHER PUBLICATIONS

"Modest But Useful Erasure Technique For DPSK," JE Hershey; RT Hoctor; AA Hassan; Electronic Letters, vol. 33, No. 1, Jan. 2, 1997, pp. 21–22.

* cited by examiner

Primary Examiner—Jeffery Hofsass
Assistant Examiner—Tai T. Nguyen
(74) Attorney, Agent, or Firm—Jill M. Breedlove; Christian G. Cabou

(57) ABSTRACT

A communication system for communicating a modified geometric harmonic modulated (GHM) signal on a power line is described. The system includes a transmitter for transmitting a GHM signal having a plurality of carriers, a highest frequency carrier being about 630 Hz, and a receiver for receiving the transmitted GHM signal.

14 Claims, 1 Drawing Sheet

COMMUNICATION SYSTEM UTILIZING MODIFIED GEOMETRIC HARMONIC MODULATION

BACKGROUND OF THE INVENTION

This invention relates generally to a power line communication system and more particularly, to a power line communication system for communicating commands and data on a power line.

Geometric harmonic modulated (GHM) signals for power line carrier applications consist of a set of carriers, each carrier being modulated by the same data. For example, eight carriers are evenly spaced in the frequency band between 5 kHz and 12 kHz yielding a GHM signal s(t) characterized by the relationship:

$$s_i(t)=\sin(2\pi\cdot 5010t)-\sin(2\pi\cdot 5610t)+\sin(2\pi\cdot 6210t)+\sin(2\pi\cdot 6810t)-\sin(2\pi\cdot 7410t)+\sin(2\pi\cdot 8010t)+\sin(2\pi\cdot 8610t)+\sin(2\pi\cdot 9210t).$$

The eight carriers of the above characterized signal are positioned at selected frequencies of 5010 Hz, 5610 Hz, 6210 Hz, 6810 Hz, 7410 Hz, 8010 Hz, 8610 Hz, and 9210 Hz. The signs of the eight sinusoidal carriers are selected according to a Shapiro-Rudin sequence to keep the signaling crest factor low.

Typical GHM signals such as the one described above utilize frequencies above about 5 kHz to avoid the large spectral components of the 60 Hz power signal transmitted on most power lines. However, use of GHM signals at typical frequencies has attendant disadvantages. First, the efficiency of transmission of the GHM signal through distribution transformers drops off as the GHM signals increase in frequency. This is because the transformer acts like a low pass filter. In addition, typical GHM signals are severely attenuated by capacitor banks.

BRIEF SUMMARY OF THE INVENTION

The present invention is a communication system for communicating on a power line comprising a transmitter adapted to provide a GHM signal which is lower in frequency than the typical GHM signal such that the GHM signal is capable of being transmitted through distribution transformers and capacitor banks. The GHM signal is combined with a power signal for transmission with the power signal. The system further comprises a receiver configured to remove an estimate of the power signal from the combined signal and to provide the GHM signal at an output. The GHM receiver includes an estimator for generating an estimated power signal, a summer for subtracting the estimated power signal from the signal transmitted on the power line to segregate the transmitted GHM signal si(t), an analog to digital converter coupled to an output of the summer, and a demodulator coupled to an output of the analog to digital converter.

DETAILED DESCRIPTION OF THE INVENTION

Figure 1:
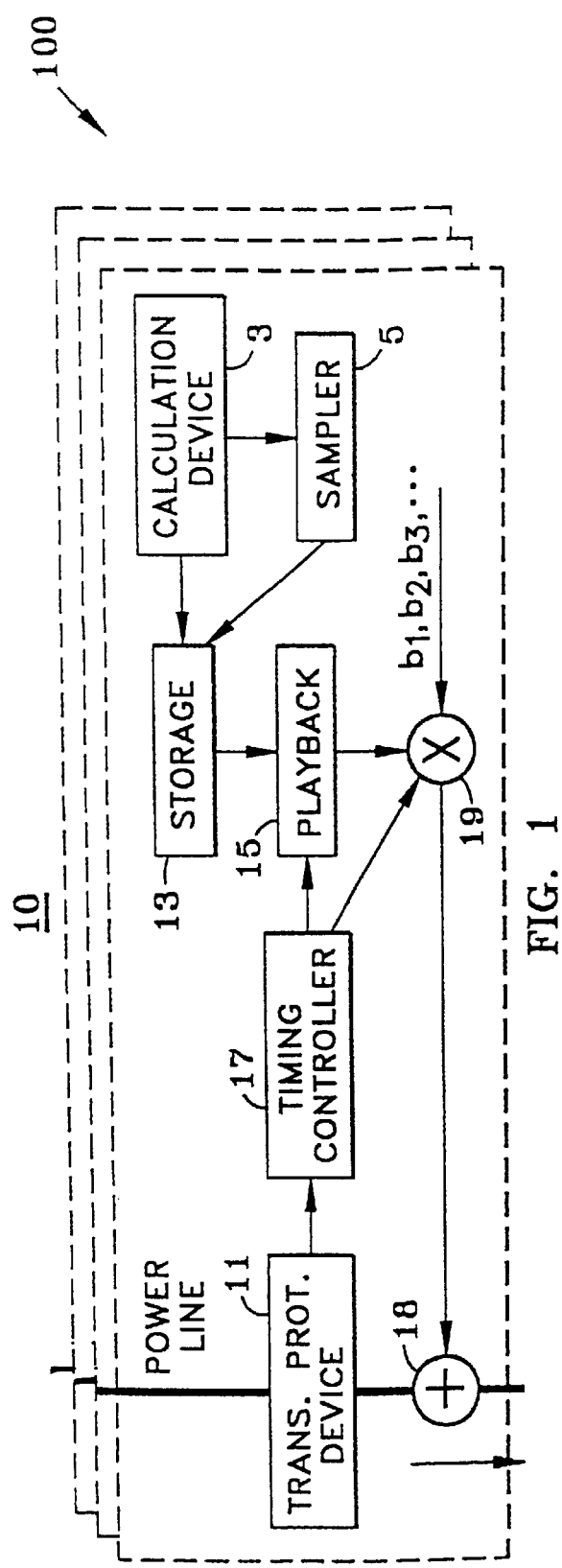
FIG. 1 is a simplified block diagram of a transmitter.

FIG. 1 illustrates an exemplary embodiment of a transmitter adapted to transmit GHM signals of the present invention. Generally, GHM allocates signaling energy into lobes, or tones, or different frequencies evenly spaced. GHM signal waveforms are true spread spectrum signals in that the signal bandwidth, i.e., the bandwidth from the lowest frequency tone to the highest, exceeds the information bandwidth conveyed by the GHM transmission.

In accordance with an embodiment of the present invention, transmitter 10 transmits, on the power line, a GHM signal si(t) characterized as:

$$s_i(t)=\sin(2\pi\cdot 210t)-\sin(2\pi\cdot 270t)+\sin(2\pi\cdot 330t)+\sin(2\pi\cdot 390t)-\sin(2\pi\cdot 450t)+\sin(2\pi\cdot 510t)+\sin(2\pi\cdot 570t)+\sin(2\pi\cdot 630t).$$

The signal carriers have frequencies of 210 Hz, 270 Hz, 330 Hz, 390 Hz, 450 Hz, 510 Hz, 570 Hz, and 630 Hz, and each carrier frequency is situated in the interstices of multiples of 60 Hz. As compared to the signal carriers of typical GHM signal which have frequencies of 5010 Hz, 5610 Hz, 6210 Hz, 6810 Hz, 7410 Hz, 8010 Hz, 8610 Hz, and 9210 Hz, the carrier frequencies of the GHM signal described above are lower in frequency and therefore suitable for passing through both distribution transformers and capacitor banks.

Referring now particularly to FIG. 1, transmitter 10 is coupled to a power line by a coupler such as a transformer. In the exemplary embodiment, the number of tones, or carriers, to be transmitted is eight. The carriers are synthesized together to form a single signal, having eight carrier frequencies, by a calculation device 3, which may be a general purpose computer (e.g., microprocessor) or a device which creates a waveform (e.g., digital signal processor). The synthesized signal generated by calculation device 3 is sampled by a sampler 5, and sampler 5 stores the sampled signals in storage device 13 which is a non-volatile memory such as an electronically erasable and programmable read only memory. Synthesizing, sampling and storing the sampled signals are performed prior to transmission.

A transient protection device 11, which limits power surges in order to protect equipment down line, is coupled to a power line, typically in parallel and across a distribution transformer. Device 11 applies the power line voltage to a timing controller 17 which, in turn, obtains timing information from the fundamental 60 Hz power line frequency. That is, timing controller 17 utilizes the 60 Hz fundamental power line frequency to maintain a real time clock.

At a preselected time, e.g., at a preprogrammed time selected by a system operator, a playback device 15, controlled by timing controller 17 and coupled to storage device 13, reads out the samples from storage device 13 at a rate of 60 Hz and synchronous with the power line voltage. A multiplier 19, also coupled to timing controller 17, multiplies the waveform created by playback device 15 by a single bit (i.e., one of bits b1, b2, b3) during each single bit period. The bit sequence from playback device 15 is modified prior to transmission by multiplier 19 by a change in bit values to a series of one and negative ones, instead of ones and zeros. That is, when the waveform from playback device 15 is provided to multiplier 19, a bit value of one will not change the waveform for a bit period, while a bit value of negative one will invert the waveform. More specifically, a data source supplies a series of bits a1, a2, a3 . . . an to a level shifter which shifts the level of the supplied bits a1, a2, a3 . . . an to b1, b2, b3 . . . bn.

The resulting GHM modulated signal from multiplier 19 is summed with the power signal at a summer 18 and communicated over the power line to a receiver. Summer 18, in one embodiment, is a current transformer for imposing the GHM signal on the power signal.

Figure 2:
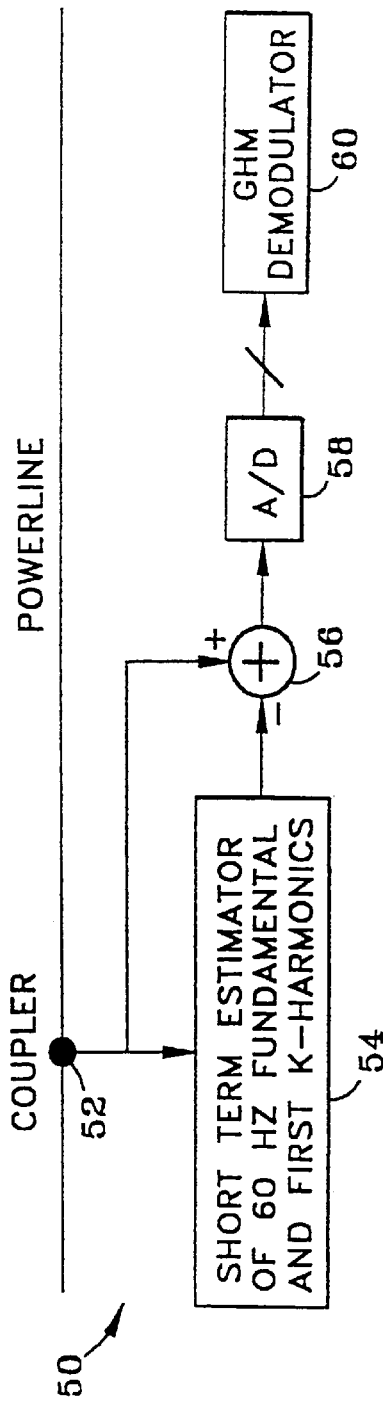
FIG. 2 is a simplified block diagram of a receiver.

FIG. 2 is a block diagram of a receiver 50 for receiving the GHM signal described above. Receiver 50 is coupled to the power line by a coupler 52, such as a transformer as is known in the art. The signal from the power line, which is a combination of both the modified GHM signal and the power signal, is supplied to a short term estimator 54, which estimates the 60 Hz fundamental and first k-harmonics of the signal on the power line, where k is a selected integer (e.g., 5). The value for k is typically selected from empirical results such that sufficient bit accuracy is provided with minimal processing. The short term estimator is a phased lock loop.

The signal from the power line is also supplied to a summer 56. Summer 56 subtracts the estimated power signal supplied by estimator 54 from the signal on the power line which contains both the 60 Hz power signal and the GHM signal. By removing the estimated fundamental and harmonics from the signal supplied directly from the power line, the GHM signal is provided from summer 56. This technique allows reception of a GHM signal which has frequency components lower than a typical GHM signal.

Known techniques can be used to reduce the dynamic range of the 60 Hz component and also some of the other large components at multiples of 60 Hz. Examples of such known techniques include analog subtraction and phase locked and delta modulated loops. An example of one such technique is described in U.S. Pat. No. 5,550,880, entitled Motor Current Signal Processor Using Analog Subtraction of an Estimated Largest Sine Wave Component, and in U.S. Pat. No. 5,550,879, entitled Motor Current Signal Processor Including Phase Locked and Delta Modulated Loops, both of which are assigned to General Electric Company. An analog subtraction loop estimates not only the 60 Hz component but also other of the large components that are multiples of 60 Hz. The loop characteristics should be slowly changing parameters so as not to introduce excessive modulation interference in the GHM signals.

By reducing the frequency of the GHM signal so that the signal carriers are positioned interstitially between multiples of 60 Hz but near the 60 Hz fundamental, for example, below about 630 Hz, the GHM signal passes through capacitor banks as well as through distribution transformers. As will be readily understood by those of ordinary skill in the art, carrier frequencies up to 9690 Hz and beyond can be employed in conjunction with the present invention. However, the maximum benefit derived from utilizing the receiver of the present invention is inversely proportional to the frequency of the GHM signal.

Analog subtraction or phase locked and delta modulated loops are employed in combination with the modified GHM signal in accordance with another embodiment of the invention, to provide interference suppression. This facilitates efficient transmission of data using lower frequency GHM signals.

The output from summer 56 is supplied to analog to digital converter 58, which converts the analog signal from summer 56 to a digital signal. The digital signal is then supplied to a GHM demodulator 60 which processes the digital signal to identify the components of the GHM signal, and the data being transmitted over the power line. Demodulator 60 includes, for example, a fast Fourier transform unit and a summer for summing the coefficients. A decision (i.e., either a logical zero or one is declared) is then made based on the sum.

While the invention has been described in terms of various specific embodiments, those skilled in the art will recognize that the invention can be practiced with modification within the spirit and scope of the claims.

What is claimed is:

1. A communication system for communications on a power line, said communication system comprising:

a transmitter for transmitting a geometric harmonic modulation (GHM)

signal $s_i(t)$ having a plurality of carriers, the GHM signal $s_i(t)$ being represented as:

$$s_i(t)=\sin(2\pi \cdot 210t)-\sin(2\pi \cdot 270t)+\sin(2\pi \cdot 330t)+\sin(2\pi \cdot 390t)-\sin(2\pi \cdot 450t)+\sin(2\pi \cdot 510t)+\sin(2\pi \cdot 570t)+\sin(2\pi \cdot 630t)$$

and a receiver for receiving the transmitted GHM signal $s_i(t)$.

2. A communication system in accordance with claim 1 wherein said highest frequency carrier is about 630 Hz.

3. A communication system in accordance with claim 2 wherein said receiver further comprises:

an analog to digital converter coupled to an output of said summer; and a demodulator coupled to an output of said analog to digital converter.

4. A communication system in accordance with claim 2 further comprising a coupler for coupling to the power line, an output of said coupler connected to said estimator and to said summer.

5. A communication system in accordance with claim 2 wherein said estimator generates an estimated power signal comprising a fundamental and first k-harmonics of an actual power signal on the power line where k is a selected integer.

6. A communication system in accordance with claim 1 wherein said receiver comprises:

an estimator for generating an estimated power signal; and a summer configured to subtract the estimated power signal from a signal on the power line.

7. A communication system in accordance with claim 1 wherein said receiver further comprises at least one of a phase locked loop and a delta modulated loop to suppress interference.

8. A communication system in accordance with claim 1 further comprising an analog subtraction loop to estimate at least the 60 Hz component of the power signal.

9. A geometric harmonic modulation (GIM) signal $s_i(t)$ transmitted over, and received from, a power line, said signal comprising a plurality of carriers, a highest frequency carrier having a frequency about 630 Hz, said GHM signal $s_i(t)$ being represented as:

$$s_i(t)=\sin(2\pi \cdot 210t)-\sin(2\pi \cdot 270t)+\sin(2\pi \cdot 330t)+\sin(2\pi \cdot 390t)-\sin(2\pi \cdot 450t)+\sin(2\pi \cdot 510t)+\sin(2\pi \cdot 570t)+\sin(2\pi \cdot 630t).$$

10. A geometric harmonic modulation (GHM) receiver for receiving a GUM data signal $$s_i(t)=\sin(2\pi \cdot 210t)-\sin(2\pi \cdot 270t)+\sin(2\pi \cdot 330t)+\sin(2\pi \cdot 390t)-\sin(2\pi \cdot 450t)+\sin(2\pi \cdot 510t)+\sin(2\pi \cdot 570t)+\sin(2\pi \cdot 630t),$$

said GHM receiver receiving the GHM data signal from a power line used for transmitting a power signal including a fundamental power signal and harmonic signals, said receiver comprising:

an estimator for generating an estimated power signal;

a summer for subtracting the estimated power signal from the signal transmitted on the power line;

an analog to digital converter coupled to an output of said summer; and a demodulator coupled to an output of said analog to digital converter.

11. A receiver in accordance with claim 10 further comprising a coupler for coupling to the power line, an output of said coupler connected to said estimator and to said summer.

12. A receiver in accordance with claim 10 wherein said estimator generates an estimated power signal comprising a fundamental and first k-harmonics of an actual power signal on the power line where k is a selected integer.

13. A receiver in accordance with claim 10 further comprising at least one of a phase locked loop and a delta modulated loop.

14. A receiver in accordance with claim 10 further comprising an analog subtraction loop to estimate at least the 60 Hz component of the power signal.

* * * * *